HEAT SINK AND ELECTRICAL CONNECTION MEANS FOR
AN IGNITRON FIRING DEVICE

Filed Nov. 9, 1967

INVENTOR
CHARLES R. WETTER

BY Jon Carl Galow
ATTORNEY

United States Patent Office
3,515,936
Patented June 2, 1970

3,515,936
HEAT SINK AND ELECTRICAL CONNECTION MEANS FOR AN IGNITRON FIRING DEVICE

Charles R. Wetter, Bloomington, Ill., assignor to General Electric Company, a corporation of New York Filed Nov. 9, 1967, Ser. No. 681,676
Int. Cl. G05f *1/00;* H05b *37/02*
U.S. Cl. 315—196 15 Claims

ABSTRACT OF THE DISCLOSURE

A water cooled ignitron having a mounting bracket upon which is mounted a semiconductor firing device such that an electrode of the device is electrically connected to the cathode of the ignitron, and the device is cooled by transfer of heat to the bracket which is thermally connected to the ignitron cooling system and electrically connected to the ignitron cathode.

BACKGROUND OF THE INVENTION

This invention generally relates to ignitrons and, particularly, to water cooled ignitrons in combination with firing devices therefor.

It is necessary when using an ignitron, to provide a firing control device such as a thyratron or a semiconductor to control the delivery of a firing impulse to the ignitor of the ignitron. Particularly, when a semiconductor firing device is used, it is necessary to provide a heat sink therefor to prevent thermal deterioration of the device. Air cooled heat sinks for semiconductor devices are available which comprise a mounting base and cooling fins formed from a good heat conductive material such as copper. Also, liquid cooling or refrigeration means have been developed specifically for cooling semiconductor devices. However, both of these arrangements and others occupy considerable space and add considerable cost. Nevertheless, it is desirable to provide a compact mounting arrangement for the firing control device and the ignitron.

OBJECT OF THE INVENTION

Accordingly, it is the object of the subject invention to provide a compact and inexpensive cooling and electrical connecting assembly for a firing control device for an ignitron through which the device is cooled by the ignitron cooling system and is electrically connected to the ignitron.

SUMMARY OF THE INVENTION

The foregoing object is accomplished in accordance with this invention when a preferred embodiment is utilized with an ignitron provided with a cooling system including an enclosing electrically and thermally conductive jacket, and an ignitron firing control device at least partially enclosed in an electrically and thermally conductive member. Wherein the jacket of the ignitron is electrically connected to one of the main current carrying terminals of the ignitron, and one of the main current carrying terminals of the device is electrically connected to the member partially enclosing it, in accordance with this invention the main current carrying terminals of the ignitron and of the device are electrically connected through the ignitron jacket and the device housing. Similarly, in accordance with this invention a heat transfer path from the device is provided through the member partially enclosing the device and the ignitron jacket to the ignitron cooling system whereby the device is cooled by the ignitron cooling system.

Other objects and further details of that which is believed to be novel in the invention will be clear from the following description and claims taken with the accompanying drawing wherein:

DESCRIPTION OF A PREFERRED EMBODIMENT

Figure 1:
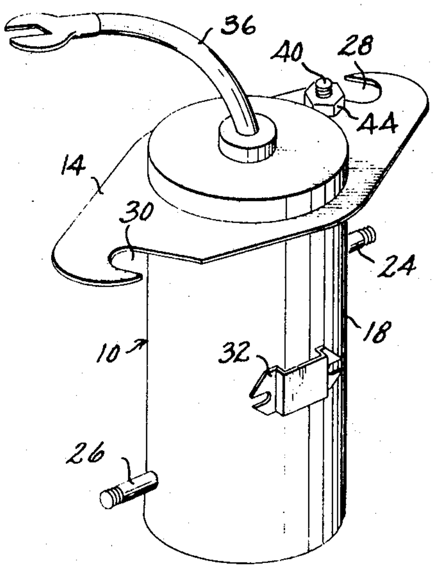
FIG. 1 is a perspective view of a water cooled ignitron provided with a bracket wherein a stud mounted semiconductor control device is mounted on the bracket by the novel and improved assembly contemplated by this invention.
Figure 2:
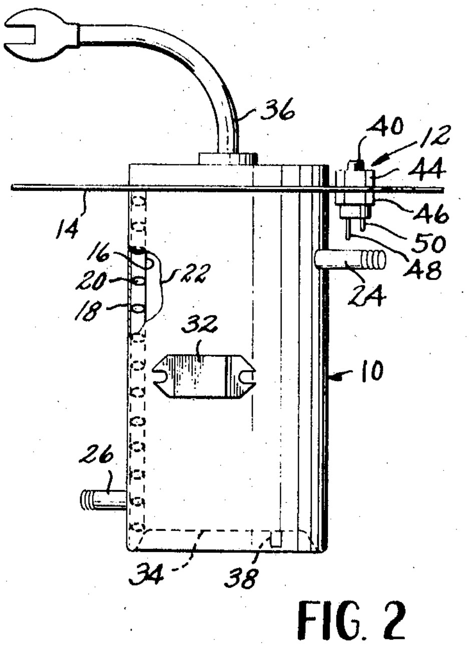
FIG. 2 is a side view of the assembly shown in FIG. 1.
Figure 3:
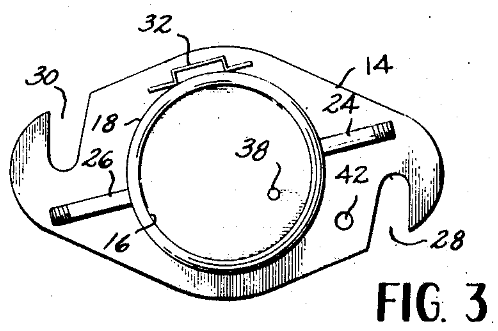
FIG. 3 is a bottom view of the water cooled ignitron provided with a bracket as shown in FIG. 1 without the semiconductor control device mounted on the bracket.

Referring to FIGS. 1–3, one embodiment of the assembly of this invention as utilized with an ignitron 10 and a stud mounted semiconductor control device 12 will be described. In accordance with the invention an improved assembly is provided for cooling the semiconductor control device 12 and for electrically connecting at least one of its electrodes to the cathode of ignitron 10. The assembly includes a bracket 14 which is provided for mounting the ignitron, and upon which the semiconductor control device 12 is also mounted.

The ignitron 10 is shown as a coaxial ignitron wherein as shown by the dotted lines in FIG. 2, an inner cylindrical wall 16 is disposed within and electrically connected to a cylindrical outer casing 18 so as to form therebetween a substantially cylindrical cooling fluid passageway 20 in which are mounted flow directing vanes 22. In order to supply a cooling fluid such as water to the passageway 20, an inlet 24 and an outlet 26 are provided. The bracket 14 is mechanically secured to the outer casing 18 such as by welding, whereby heat developed in or applied to the bracket 14 is transferred to the outer casing 18 and is carried away by the cooling fluid in the passageway 20. If heat is developed in or applied to the bracket 14, some of it may also be transferred to the structure upon which the bracket 14 is supported and to which it may be secured by bolts (not shown) which are engaged in slots 28 and 30. However, the cooling fluid in passageway 20 will normally maintain the outer casing 18 at a lower temperature than the structure on which the bracket 14 is supported, such that heat will flow from the bracket to the outer casing 18 rather than to the supporting structure. In order to control the temperature of the ignitron, mounting plate 32 is secured to the outer casing 18 to support a thermostat (not shown) which is associated with a system for controlling or regulating the cooling fluid flow through passageway 20.

The ignitron 10 which is a mercury-pool gas tube operating in the arc region has its mercury-pool cathode in direct contact with the inner cylindrical wall 16 and a bottom wall 34, such that external electrical connection to the cathode may be made through the outer casing 18 and the bracket 14. External connection is made to the anode through a flexible conductor 36 which is insulated from the metal housing. An arc cathode spot is initiated to cause conduction in the ignitron between anode and cathode by the application of a firing impulse or control signal to an ignitor which is connected to terminal 38 insulatingly supported from the bottom wall of the ignitron. The ignitron briefly described above is more particularly described and is claimed in U.S. Pat. 2,967,966, assigned to the same assignee as the present invention. While an ignitron of this design is preferred in the present invention, other ignitrons provided with a cooling system and a mounting bracket could be used.

The semiconductor control device 12 is provided to control the delivery of a firing impulse to either the ignitor of ignitron 10 through terminal 38 or the ignitor of another ignitron. The device 12 is a stud mounted semiconductor controlled rectifier or SCR, by International Electro-Technical Commission standards named a reverse blocking triode thyristor. While this particular device is shown, which will hereinafter be referred to as an SCR, any other semiconductive control device having suitable control, voltage and power handling capabilities may be utilized. It is only necessary that the semiconductive device which is employed exhibit a high impedance characteristic in the absence of a control signal of a predetermined amplitude, and that it exhibit a low impedance characteristic in the presence of a control signal of a magnitude greater than the predetermined amplitude at its gate.

The stud mounted SCR 12 as shown in FIGS. 1 and 2 is fastened to the bracket 14 by passing stud 40 through an aperture 42 provided in the bracket, and by securing the stud with a nut 44. The stud 40 is typically formed of a metal which is a good thermal and electrical conductor, such as copper, and serves as one terminal of the SCR and also as the base for the SCR housing. The stud 40 also provides a thermal path for conducting heat losses from the semiconductive material. Generally, the stud 40 is connected to the semiconductive material to form the anode terminal of the device, but in an alternative arrangement it may be connected to form the cathode terminal. A second main current carrying terminal 48 extends from the housing, and is generally the cathode, but in the alternative arrangement is the anode. Conduction between stud 40 and terminal 48, anode to cathode, is controlled by the application of a control or gating signal to a control or gating terminal 50.

Heat losses in the SCR 12 are conducted through the stud 40 and the nut 44 to the bracket 14, from which they are passed through the outer casing 18 to the cooling fluid passageway 20 and the cooling fluid. To provide maximum cooling effect for the SCR 12, the mounting aperture 42 should be located reasonably close to the outer casing 18, while permitting enough room for the engagement of the nut 44 on the stud 40. By this arrangement the SCR 12 may be cooled to a lower temperature than would be possible with an ordinary air cooled heat sink, and thereby the SCR's reserve current carrying capacity may be increased. An additional advantage of this cooling assembly for the SCR 12 is that there will be less heat in the atmosphere about the electrical elements as the heat is directly removed by the fluid in the ignitron cooling system, thereby insuring a lower temperature within the housing in which the ignitron is housed.

Figure 4:
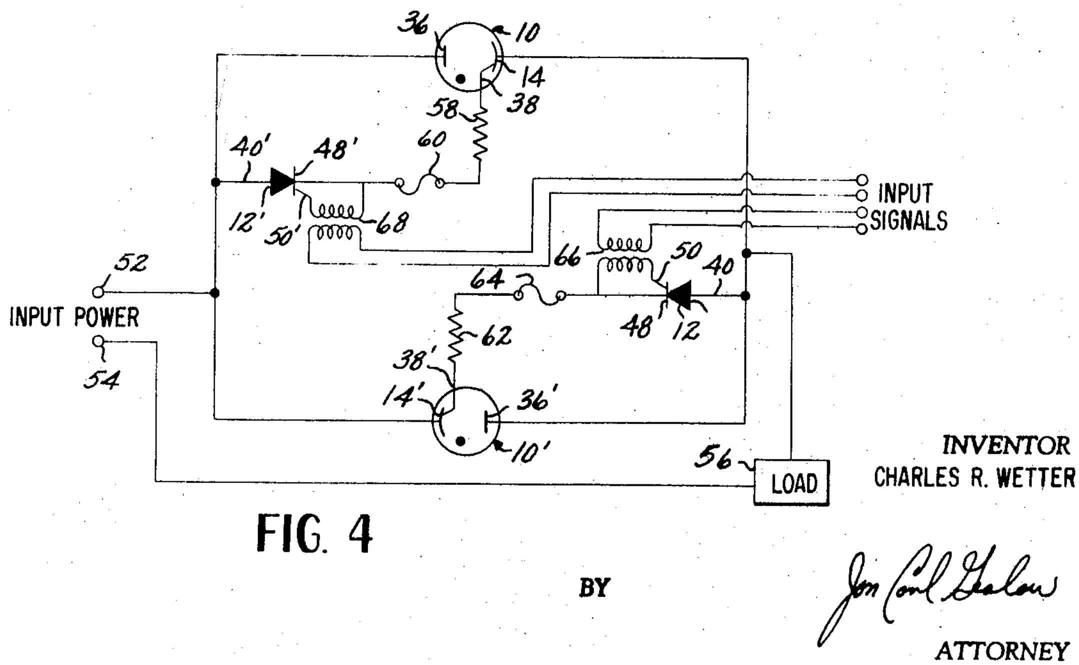
FIG. 4 is a circuit diagram showing the electrical relationship between semiconductor control devices and ignitors in a typical resistance welding circuit utilizing the assembly contemplated by this invention.

A circuit diagram of a circuit in which the cooling and electrical connecting assembly of this invention as set forth above is advantageously utilized is shown in FIG. 4. The circuit shown provides full-wave control of an alternating current supply to a load such as a resistance welder. A pair of ignitrons similar to the ignitron shown in FIGS. 1–3 are connected in inverse parallel relationship between one of a pair of input terminals 52 and 54 to which an AC voltage source is connected and one terminal of a load represented by the block 56. To aid in the understanding of the invention, one of the ignitrons and one of the SCR's will bear the same numerals as used in FIGS. 1–3, while the other ignitron and the other SCR will bear the same numerals but with a prime thereafter. Wherein as previously set forth, the mercury-pool cathode of the ignitron 10 is connected through the cylindrical inner wall 16 and the outer casing 18 to the bracket 14, the cathode of the ignitron will be identified by the bracket numeral 14.

In the circuit shown in FIG. 4, the SCR's 12 and 12′ are represented as being of the conventional type wherein the stud 40 is the anode terminal of the SCR. Thus using conventional SCR's, the SCR 12 mounted on the bracket 14 of the ignitron 10 is connected to control the application of a firing impulse to ignitron 10′. That is, an SCR does not control the firing of the ignitron on whose bracket it is mounted, but rather the firing of the other ignitron of the inverse parallel connected pair. To form the load current carrying circuit, the anode leads 36 and 36′ are connected to the brackets 14′ and 14 respectively. The brackets 14′ and 14 must be mounted such that they are insulated from each other, and as is shown in FIG. 4, bracket 14 is connected to one of the load terminals while bracket 14′ in connected to input terminal 52. The power circuit is completed by connecting the second terminal of the load 56 directly to the second input terminal 54.

The control signal applied to the ignitors 38 and 38′ of each ignitron is derived from the voltage applied to its anode, and is applied thereto through an SCR, a current limiting resistor and an overload protective device such as a fuse. Referring to ignitron 10, the control signal is applied to its ignitor terminal 38 through the series circuit comprising the anode 40′-cathode 48′ circuit of SCR 12′, current limiting resistor 58 and a fuse 60. Similarly, the control signal is applied to ignitor terminal 38′ of ignitron 10′ through the series circuit comprising the anode 40-cathode 48 circuit of SCR 12, current limiting resistor 62 and a fuse 64.

Ignitrons and SCR's are both unidirectional conducting devices, conducting only when the voltage appearing at their anodes is positive with respect to their cathode voltages. Further, unless their respective breakdown voltages are exceeded, they will not conduct until a control signal of the proper polarity is applied to their ignitor or gate respectively. Thus, it is necessary to provide a gating signal to the gate of the SCR when its anode is positive in order to provide a control signal to the ignitor of the ignitron when its anode is positive in order to start its conduction. Gating signals are provided to SCR 12 through an isolation pulse transformer 66, and to SCR 12′ through an isolation pulse transformer 68. While separate pulse transformers are shown, a single pulse transformer having a primary winding and a pair of isolated secondary windings could be used.

In operation of the full-wave control circuit shown in FIG. 4, the ignitrons 10 and 10′ and their associated control SCR's 12′ and 12 respectively may be caused to conduct during alternate half cycles of the AC supply. When the input terminal 52 connected to the anode lead 36 is positive, ignitron 10 and SCR 12′ will not conduct until an input signal is provided to pulse transformer 68 to be applied to gate 50′ of SCR 12′ to turn on SCR 12′, and thereby apply a signal to the ignitor terminal 38 to initiate a mercury arc between anode 36 and cathode 14. After an arc has been initiated, current flow between anode 36 and cathode 14, and therefore through load 56 will continue until the end of the half cycle. Similarly, during the following half cycle, current will flow between anode 36′ and cathode 14′ of ignitron 10′ and therefore through load 56 only after a signal has been applied to the gate 50 of SCR 12 through pulse transformer 66. Once conduction is initiated between anode 36′ and cathode 14′ current will continue to flow until the end of the half cycle. Should the load 56 be the input winding of a resistance welding transformer, the input signals to pulse transformers 66 and 68 would be sychronized with the AC voltage source connected to the input terminals 52 and 54, such that for each adjacent pair of half cycles of the AC voltage source ignitrons 10 and 10′ begin conducting at approximately the same point in their respective half cycles, thus balancing the ampere-turns applied to the transformer primary winding. Thus, the cooling and electrical connecting assembly of this invention provides for a compact ignitron-SCR arrangement with SCR's of the conventional type, in a full-wave control circuit comprising inverse parallel connected ignitrons.

Not only does the assembly of this invention provide low temperature cooling for firing devices for water cooled ignitrons, but it also decreases the possibility for wiring errors by combining electrical connections and necessary mechanical mountings, and is more vibration resistant due to the elimination of a number of wiring connections. The cooling and electrical connecting assembly is also extremely compact, eliminating the need for air-cooled heat sinks which occupy considerable space.

While a stud mounted SCR is shown and described in the above description of a preferred embodiment of this invention, other arrangements for electrically connecting and mechanically securing an SCR to an ignitron mounting bracket may be utilized. For instance, the assignee of the present invention presently encapsulates the semiconductor pellet of an SCR in what is called a "PRESS PAK" arrangement wherein the housing is of a cylindrical shape, with conductive buttons formed centrally on the ends being the anode or cathode terminals of the SCR, and a conductive annular ring forms the gate terminal. In utilizing an SCR encapsulated in this way, spaced holes might be provided in the bracket 14 to receive clamping means such as bolts which cooperate with spring plates having similarly spaced holes formed therein, to press the SCR against the bracket so as to secure it thereto. Thus, again in this arrangement one of the terminals of the SCR is directly connected to the cathode of the ignitron on which it is mounted through the bracket 14.

Semiconductive devices and more particularly SCR's are packaged in still another way, wherein a cylindrical housing forms one of the terminals and is knurled on the outer surface to be received in a press-fit in an aperture in a metallic plate which serves as an electrical connector to the terminal of the semiconductive device and also as a heat sink. In the cooling and electrical connecting assembly of this invention, an SCR packaged in this way would be press-fit in the aperture 42 provided in the bracket 14.

While particular embodiments of this invention have been shown and described, it will be obvious to those skilled in the art that various changes and modifications may be made without departing from this invention in its broader aspects and, therefore, it is intended that the appended claims cover all such changes and modifications as fall within the true spirit and scope of this invention.

What I claim as new and desire to secure by Letters Patent of the United States is:

1. A combination heat sink and electrical connection means for an ignitron firing control device comprising:

(a) a substantially planar mounting member of thermally and electrically conductive material;

(b) an ignitron having a cooling system including an enclosing electrically and thermally conductive jacket and having one main current carrying terminal electrically connected to said jacket;

(c) an ignitron firing control device at least partially enclosed by an electrically and thermally conductive member which forms one main current carrying terminal of said ignitron firing control device and also forms a path for transferring from said ignitron firing control device heat developed within said ignitron firing control device;

(d) said substantially planar mounting member including first means for connecting said ignitron in thermally and electrically conductive relationship therewith;

(e) said substantially planar mounting member including second means for connecting said substantially planar mounting member and thereby said ignitron to a support structure;

(f) said substantially planar mounting member including third means for supporting said ignitron firing control device thereon in thermally and electrically conductive relation therewith;

(g) said substantially planar mounting member providing a heat conducting path for conducting said heat developed within said ignitron firing control device from said ignitron firing control device through said substantially planar mounting member to said cooling system of said ignitron; and (h) said substantially planar mounting member providing an electrically conductive path between said ignitron firing control device and said ignitron for electrically connecting said one main current carrying terminal of said ignitron firing control device and said one main current carrying terminal of said ignitron.

2. The combination defined in claim 1, wherein the portion of said member is formed as a stud.

3. The combination defined in claim 1, wherein said one main current carrying terminal of the ignitron is its cathode, and said one main current carrying terminal of the firing control device is its anode.

4. The combination defined in claim 1, wherein said one main current carrying terminal of the ignitron is its cathode, and said one main current carrying terminal of the firing control device is also its cathode.

5. The combination defined in claim 1, wherein the firing control device is a semiconductor control device.

6. A cooling and electrical connecting assembly comprising in combination:

(a) an ignitron having a cooling system including an enclosing electrically and thermally conductive jacket and having an ignitor, (b) an electrically and thermally conductive bracket attached to the jacket for supporting said ignitron, said ignitron having one main current carrying terminal electrically connected to the bracket through the jacket, (c) a firing control device at least partially enclosed by an electrically and thermally conductive member which forms one main current carrying terminal of said device and also forms a path for transferring from said device heat developed within said device, and (d) means for securing said firing control device to the bracket so as to provide electrical and thermal connections between the member and the bracket, whereby an electrical connection is made between said one main current carrying terminal of said ignitron and said one main current carrying terminal of said firing device, and heat developed within said device is transferred from said device through the member and the bracket and the jacket to the cooling system of said ignitron.

7. The combination defined in claim 6, wherein said means for securing includes at least one aperture formed in the bracket and also includes a securing means received in the aperture.

8. The combination defined in claim 7, wherein said securing means comprises a portion of said member.

9. The combination defined in claim 8, wherein the portion of said member is formed as a stud.

10. The combination defined in claim 6, wherein said one main current carrying terminal of the ignitron is its cathode, and said one main current carrying terminal of the firing control device is its anode.

11. The combination defined in claim 6, wherein said one main current carrying terminal of the ignitron is its cathode, and said one main current carrying terminal of the firing control device is also its cathode.

12. The combination defined in claim 6, wherein the firing control device is a semiconductor control device.

13. The combination defined in claim 6, wherein the firing control device is a semiconductor controlled rectifier.

14. A cooling and electrical connecting assembly for components of a full-wave alternating current control circuit comprising in combination:

(a) first and second ignitrons each having a cooling system including an enclosing electrically and thermally conductive jacket and each having an ignitor, (b) a pair of electrically and thermally conductive brackets each attached to a separate jacket for supporting said ignitrons, each ignitron having a first main current carrying terminal electrically connected to its bracket through its jacket and having a second main current carrying terminal electrically insulated from its jacket and bracket, said second main current carrying terminals of said first and second ignitrons being electrically connected to the first main current carrying terminals of said second and first ignitrons respectively, (c) first and second firing control devices for controlling the delivery of firing impulses to the ignitors of said first and second ignitrons respectively, said control devices each being at least partially enclosed by an electrically and thermally conductive member, each of which members forms a first main current carrying terminal of said device which it partially encloses and also forms a path for transferring from said device which it partially encloses heat developed within said device, and (d) a first securing means for securing one of said firing control devices to the bracket of one of said ignitrons, and a second securing means for securing the other of said control devices to the bracket of the other of said ignitrons, so as to provide electrical and thermal connections between each member and the bracket on which it is secured, whereby electrical connections are made between said first main current carrying terminals of said ignitrons and one of said first main current carrying terminals of said devices, and heat developed within said devices is transferred from said devices through said members and the brackets and the jackets to the cooling systems of said ignitrons.

15. The combination defined in claim 1, wherein said third means for supporting said ignitron firing control device comprises an aperture suitably sized for receiving a portion of said member of said ignitron firing control device.

References Cited

UNITED STATES PATENTS

| | | | |
|---|---|---|---|
| 2,235,396 | 3/1941 | Brubaker | 315—113 |
| 2,428,587 | 10/1947 | Rose | 315—113 |
| 2,822,489 | 2/1958 | Zehner | 313—11 X |
| 2,906,902 | 9/1959 | Steiner | 313—11 X |
| 2,983,833 | 5/1961 | Zehner | 315—118 X |
| 3,229,161 | 1/1966 | Anger | 315—196 |
| 3,260,891 | 7/1966 | Judson | 315—200 X |
| 3,312,890 | 4/1967 | Suel | 315—196 X |

JOHN W. HUCKERT, Primary Examiner

A. J. JAMES, Assistant Examiner

U.S. Cl. X.R.

315—200, 209, 118, 113; 174—15; 313—11, 25, 35